(12) United States Patent
Frank et al.

(10) Patent No.: US 10,081,274 B2
(45) Date of Patent: Sep. 25, 2018

(54) CHILD SAFETY SEAT

(71) Applicant: BRITAX RÖMER KINDERSICHERHEIT GMBH, Ulm (DE)

(72) Inventors: Richard Frank, Elchingen (DE); Iain Powell, Ulm (DE); Farid Bendjellal, Rueil-Malmaison (FR)

(73) Assignee: BRITAX RÖMER KINDERSICHERHEIT GMBH, Ulm (DE)

( * ) Notice: Subject to any disclaimer, the term of this patent is extended or adjusted under 35 U.S.C. 154(b) by 271 days.

(21) Appl. No.: 14/946,971

(22) Filed: Nov. 20, 2015

(65) Prior Publication Data
US 2016/0144752 A1    May 26, 2016

(30) Foreign Application Priority Data

Nov. 20, 2014 (EP) .................................... 14003908

(51) Int. Cl.
*B60N 2/28* (2006.01)
*B60N 2/42* (2006.01)
*B60N 2/427* (2006.01)

(52) U.S. Cl.
CPC ......... *B60N 2/2884* (2013.01); *B60N 2/2803* (2013.01); *B60N 2/286* (2013.01);
(Continued)

(58) Field of Classification Search
CPC ..................................... B60N 2/2884
See application file for complete search history.

(56) References Cited

U.S. PATENT DOCUMENTS

| 5,664,830 A * | 9/1997 | Garcia | B60N 2/2821 |
|---|---|---|---|
| | | | 297/216.11 |
| 6,454,350 B1 * | 9/2002 | Celestina-Krevh | ............ |
| | | | B60N 2/2821 |
| | | | 297/216.11 |

(Continued)

FOREIGN PATENT DOCUMENTS

| CN | 101670795 A | 3/2010 |
|---|---|---|
| CN | 102811884 A | 12/2012 |

(Continued)

OTHER PUBLICATIONS

Extended Search Report and Written Opinion from corresponding European application No. 14003908.2 dated May 22, 2015, all enclosed pages cited.

(Continued)

*Primary Examiner* — David R Dunn
*Assistant Examiner* — Tania Abraham
(74) *Attorney, Agent, or Firm* — McNair Law Firm, P.A.

(57) ABSTRACT

The child safety seat (1) for use in a vehicle in accordance with the invention comprises a seat member (3) configured to hold a child (2), a base member (4) adapted to be attached to a seat (15) of the vehicle, and a deformable energy absorbing element (20), wherein the seat member (3) is slidably mounted to the base member (4) in such a way that the seat member (3) is displaceable from an initial position to a shifted position by sliding the seat member (3) relative to the base member (4) and in such a way that crash-induced inertial forces acting on the child safety seat (1) during a frontal collision of the vehicle tend to slide the seat member (3) from the initial position to the shifted position, wherein the deformable energy absorbing element (20) is arranged to be deformed when the seat member (3) is slid from the initial position to the shifted position.

13 Claims, 9 Drawing Sheets

(52) U.S. Cl.
CPC ......... *B60N 2/2821* (2013.01); *B60N 2/2851* (2013.01); *B60N 2/4221* (2013.01); *B60N 2/42709* (2013.01)

(56) References Cited

U.S. PATENT DOCUMENTS

| | | | | |
|---|---|---|---|---|
| 6,513,870 | B1* | 2/2003 | Takizawa | B60N 2/2812 297/216.11 |
| 6,669,288 | B2* | 12/2003 | Nakagawa | B60N 2/2821 297/216.11 |
| 7,857,386 | B2* | 12/2010 | Van der Vegt | B60N 2/2827 297/256.1 |
| 8,348,337 | B2* | 1/2013 | Franck | B60N 2/2809 297/216.11 |
| 2010/0109215 | A1* | 5/2010 | Ruthinowski | B60N 2/2809 267/140.13 |
| 2011/0233978 | A1* | 9/2011 | Clement | B60N 2/2821 297/256.13 |
| 2012/0319442 | A1* | 12/2012 | Clement | B60N 2/2821 297/216.11 |
| 2013/0169013 | A1* | 7/2013 | Carine | B60N 2/2809 297/254 |
| 2014/0232152 | A1* | 8/2014 | Minato | B60N 2/2809 297/216.11 |
| 2016/0121764 | A1* | 5/2016 | Clement | B60N 2/2884 297/216.11 |

FOREIGN PATENT DOCUMENTS

| | | | |
|---|---|---|---|
| CN | 103612576 A | 3/2014 | |
| CN | 103895540 A | 7/2014 | |
| EP | 2746096 A1 * | 6/2014 | ........... B60N 2/2809 |
| GB | 2417416 A | 3/2006 | |

OTHER PUBLICATIONS

Search report from corresponding Chinese application No. 201510811227.9 dated Aug. 30, 2017, all enclosed pages cited.
Office Action from corresponding Chinese application No. 201510811227.9 dated Aug. 30, 2017, all enclosed pages cited.

* cited by examiner

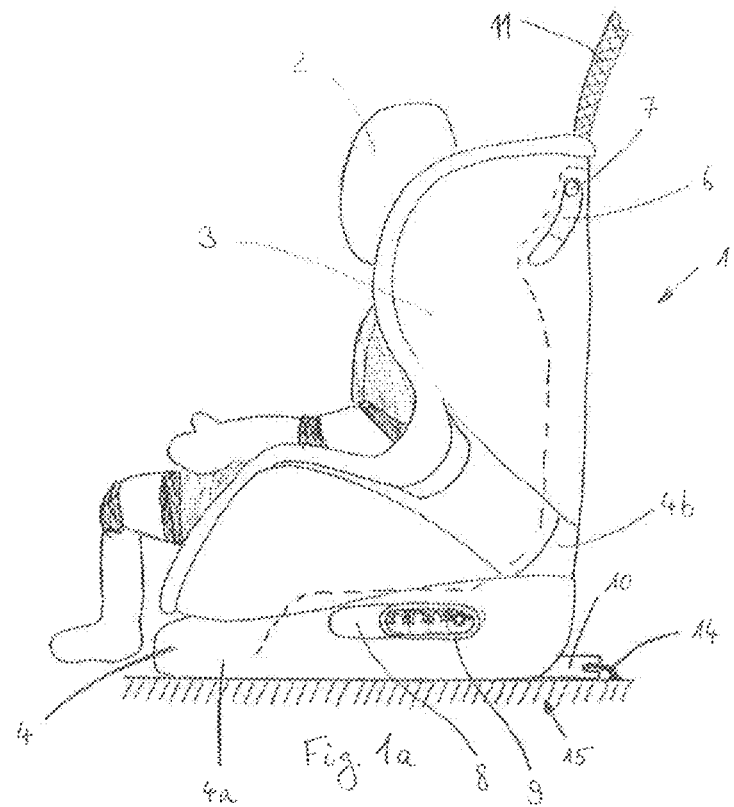
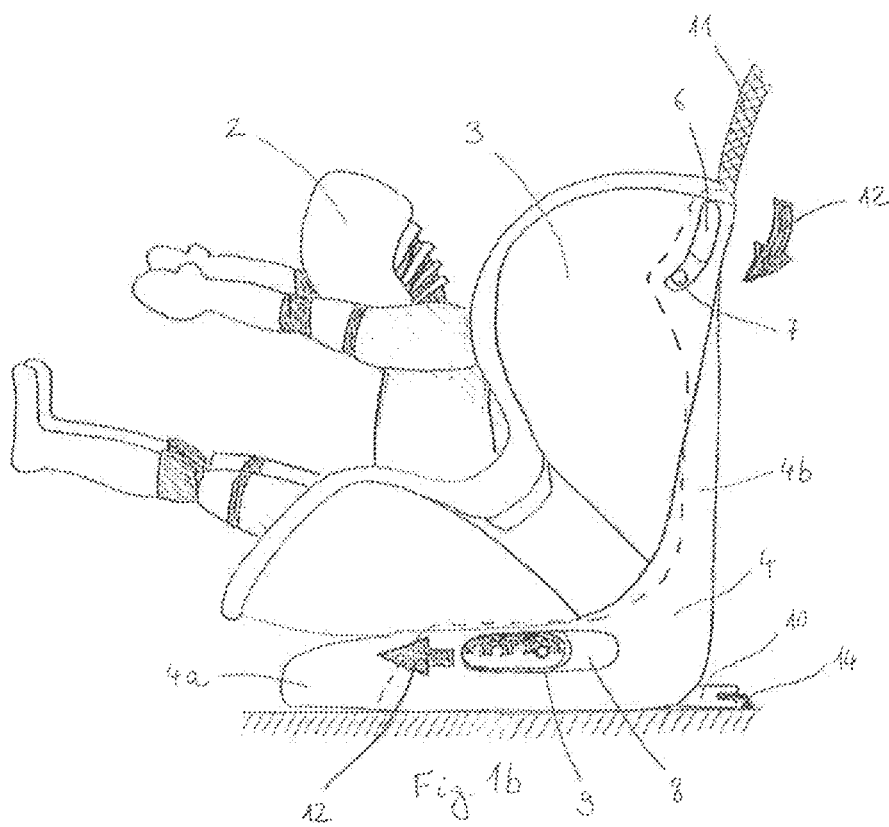

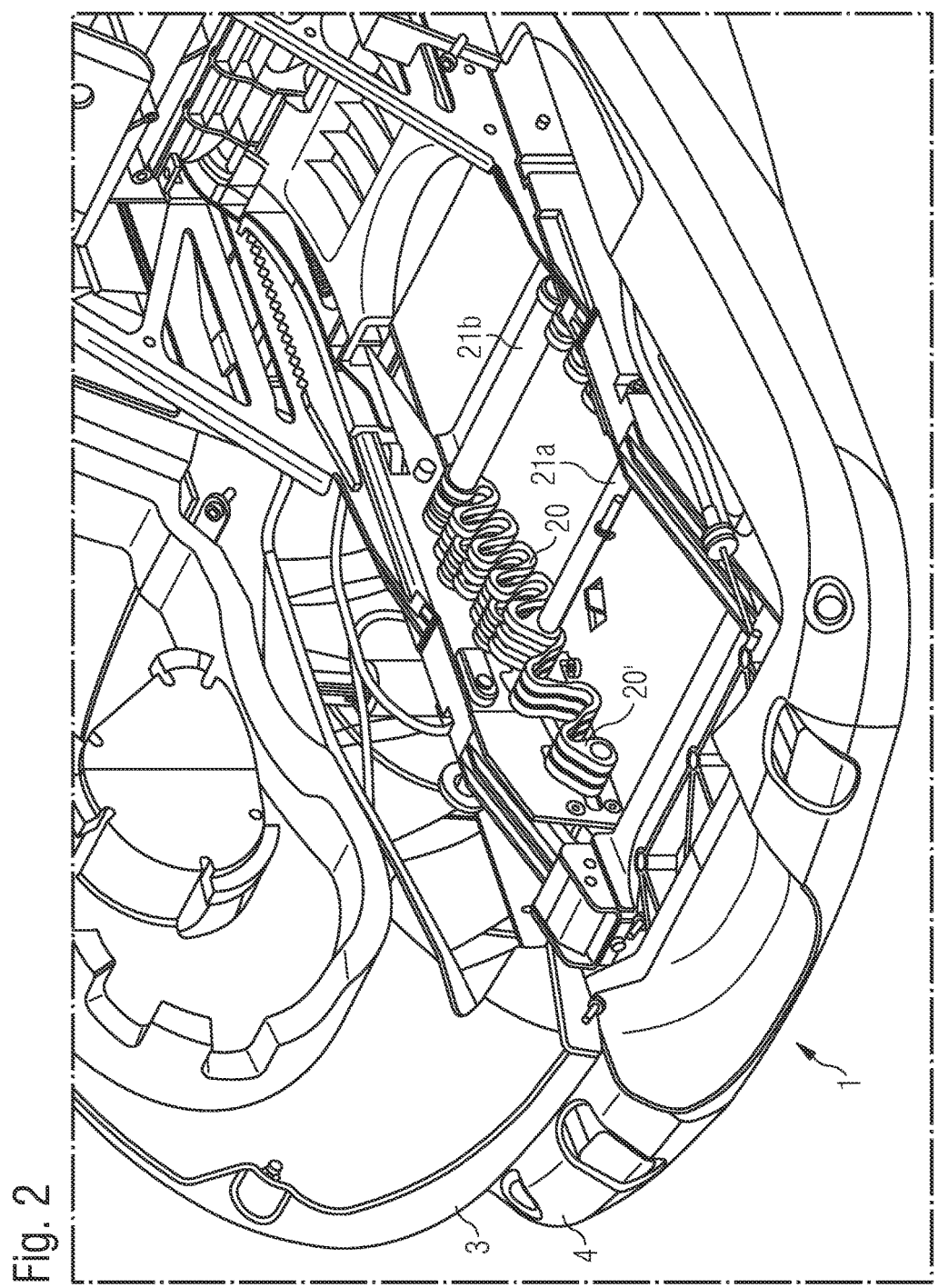

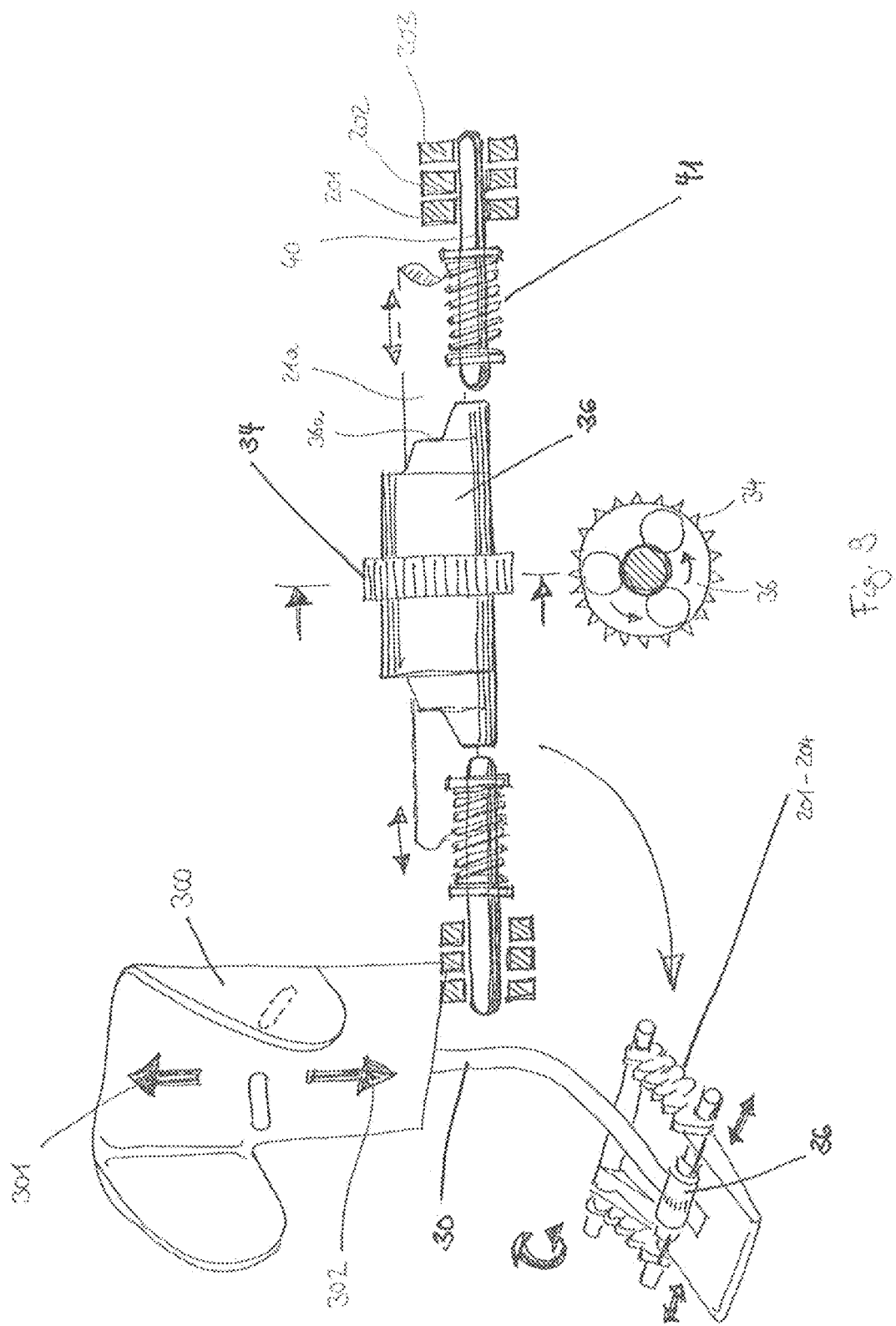

CHILD SAFETY SEAT

CROSS-REFERENCE TO RELATED APPLICATIONS

The present application claims priority to EP application number 14003908.2 filed Nov. 20, 2014, which is expressly incorporated by reference.

The present invention relates to a child safety seat and, more particularly, to a child safety seat for use in a vehicle, the child safety seat being designed to increase the level of protection provided to a child seated in the child safety seat. In particular, the child safety seat is designed to provide improved restraint performance during a frontal impact of the vehicle carrying the child safety seat.

Child safety seats are employed for safely transporting children in vehicles, in particular in cars. There is a large variety of child safety seats adapted for transporting children of different age ranges. In Europe, a system of groups has been established for categorizing child safety seats. This system ranges from "Group 0" seats suitable for newborn children via "Group 1" and "Group 2" seats up to "Group 3" seats suitable for children up to twelve years old. Based on these basic groups there exist additional groups like "Group 0+" or extended groups like "Group 0-1", "Group 1-2", "Group 2-3", or "Group 1-2-3". Besides the age of a child, other factors that have to be taken into account when choosing a child safety seat for a specific child include the weight and the height of the child. The present invention relates in particular—but not exclusively—to "Group 1" or comparable child safety seats, in particular to child safety seats comprising a harness for securing the child to the child safety seat.

In principle, a child safety seat can be mounted in a vehicle in one of two orientations: forward-facing, i.e. in such a way that a child positioned in the child safety seat faces the front of the vehicle carrying the child safety seat; or rear-facing, i.e. in such a way that a child positioned in the child safety seat faces the rear of the vehicle carrying the child safety seat. The present invention relates in particular to child safety seats configured for forward-facing installation in the vehicle. The present invention, however, is not limited to forward-facing child safety seats, it might as well be applied to rear-facing child safety seats.

The forces acting on a child sitting in a child safety seat during a crash of the vehicle carrying the child safety seat are influenced by the way the child safety seat is attached to the vehicle, i.e. by how the child safety seat is fixed to the vehicle seat it is placed on. Generally, there a two systems for fixing a child safety seat on a vehicle seat. The first system employs a seat belt provided in the vehicle for securing the child safety seat. In this system, at least one of the seat belts of the vehicle is guided in a prescribed way around or through the child safety seat thus securing the child safety seat in the desired position and orientation. An advantage of this system is that it exclusively makes use of fastening means that are usually present in every vehicle, i.e. the seat belts of the vehicle. Securing a child safety seat with a vehicle seat belt may, however, be cumbersome. Therefore, in practice, many child safety seats of this type are improperly installed in the vehicle. The second system employs fixing means which are provided in the vehicle specifically for securing a child safety seat. In Europe, the ISOFIX system has been introduced for this purpose. A vehicle seat adapted for installation of an ISOFIX child safety seat comprises anchors (ISOFIX anchors) which are provided at the lower end of the seat's seatback at the junction between the seat cushion and the seatback and which are fixedly attached to the seat. The child safety seat comprises latches (ISOFIX rigid latches) which can be releasably coupled to the anchors. Consequently, using the ISOFIX system a child safety seat can be easily and safely fixed to a vehicle seat. The child safety seat can furthermore comprise a Top Tether or a support leg as an anti-rotation device.

The primary object of a child safety seat is to protect a child from experiencing injuries if the vehicle carrying the child safety seat is involved in an accident. Since car accidents involving a frontal impact are very common, protection of the child during a frontal impact is especially important. Achieving this goal is particularly challenging due to the specifics of the child's anatomy. In particular, in the body of a child the ratio of the head's mass to the body's mass is much higher than in the body of an adult. At the age of five months, for example, a child's head constitutes about one fourth of the child's mass. Therefore, due to its high mass, a large part of the forces acting on a child during an impact is actually acting on the child's head. These forces acting on the child's head during the crash can result in injuries, in particular in injuries of the child's neck.

Therefore, it is an object of the present invention to provide a child safety seat which provides an improved restraint performance during a frontal impact of the vehicle carrying the child safety seat and which reduces the forces acting on the child's body, in particular on the child's head, neck and/or chest, during a crash of the vehicle.

This object is solved by the child safety seat for use in a vehicle in accordance with the invention with the features of claim 1. Advantageous embodiments of the present invention are indicated in subclaims 2 to 15.

The child safety seat for use in a vehicle in accordance with the invention comprises a seat member which is configured to hold a child, a base member which is adapted to be attached to a seat of the vehicle, and a deformable energy absorbing element. The seat member is slidably mounted to the base member in such a way that the seat member is displaceable from an initial position to a shifted position by sliding the seat member relative to the base member and in such a way that crash-induced inertial forces acting on the child safety seat during a frontal collision of the vehicle tend to slide the seat member from the initial position to the shifted position. The deformable energy absorbing element is arranged to be deformed when the seat member is slid from the initial position to the shifted position.

The present invention mainly, but not exclusively, relates to "Group 1" seats, i.e. child safety seats for children with an age in the range from about nine months to about four years and with a weight in the range from about 9 kg to about 18 kg. Children in this age range have learnt to sit up themselves, making the initial position the adequate position for transporting a child in a child safety seat. Preferably, the child safety seat is configured to allow the seat member's orientation to be adjusted if the seat member is locked in the initial position. In this way the seat member can, even if locked in the initial position, adopt a reclined position allowing relaxed travel.

When a vehicle carrying the child safety seat in accordance with the invention is involved in a crash, crash-induced forces will act on the child safety seat. The way the child safety seat of the invention is designed, these crash-induced forces tend to displace the seat member relative to the base member. In particular, crash-induced inertial forces tend to slide the seat member forwards, i.e. towards the front of the vehicle. Such a displacement of the seat member relative to the base member will result in a transfer of the seat member from the initial position to the shifted position. During this sliding of the seat member the deformable energy absorbing element will be deformed. As a result, when sliding forward in the course of a crash the seat member will not come to an abrupt stop but will be softly slowed down. This will improve the restraint performance of the child safety seat of the invention in a crash configuration involving a frontal impact. Advantageously, the deformable energy absorbing element is configured to dissipate energy when being deformed.

Advantageously, the child safety seat of the invention furthermore comprises a locking device which is configured to lock the seat member in the initial position, preventing sliding of the seat member from the initial position to the shifted position. The locking device is furthermore adapted to release the seat member from the initial position if the crash-induced forces reach or exceed a given threshold value, allowing the seat member to slide from the initial position to the shifted position.

Since the locking device is configured to release the seat member from the initial position if the crash-induced forces reach or exceed a given threshold value, under normal circumstances, i.e. during undisturbed travel of the vehicle carrying the child safety seat or in an insignificant accident, the seat member will always remain in the initial position. Only if the vehicle has a severe accident, the seat member will be automatically transferred from the initial position to the shifted position. Consequently, the locking device is designed and arranged to ensure that the seat member is transferred from the initial position to the shifted position if and only if the crash-induced forces reach or exceed a given threshold value. Therefore, the seat member will be automatically transferred to the shifted position if the vehicle has a serious accident with a frontal impact. Generally, it might be sufficient to keep the seat member in the initial position by means of the deformable energy absorbing element. By providing a locking device for locking the seat member in the initial position, however, the loads received by the deformable energy absorbing element can be reduced. Preferably, the deformable energy absorbing element is configured not to receive any loads when the seat member is locked in the initial position by the locking device. This will avoid material fatigue in the deformable energy absorbing element.

Preferably, the child safety seat of the invention is configured for forward-facing installation in the vehicle. Optimizing the restraint performance of this type of child safety seats in a frontal crash is particularly challenging. This is due to the fact that, on the one hand, the child safety seat has to provide energy absorption means, allowing controlled excursion of the occupant, and that, on the other hand, occupant excursion cannot exceed regulatory limits. Therefore, for a forward-facing child safety seat the advantages of the invention will be particularly valuable.

Advantageously, the deformable energy absorbing element of the child safety seat of the invention is configured to be stretched or compressed during crash-induced displacement of the seat member relative to the base member. Stretching and compressing are two simple types of deformation. Therefore, when the deformable energy absorbing element is configured to be stretched or compressed, it can be ensured that the deformable energy absorbing element will be reliably deformed during crash-induced displacement of the seat member relative to the base member. Reliable deformation of the deformable energy absorbing element in the course of a crash is extremely important for achieving an improved restraint performance of the child safety seat of the invention. Only when the deformable energy absorbing element gets deformed during the crash, a considerable amount of crash energy will be dissipated.

Preferably, the child safety seat of the invention furthermore comprises a first mounting device fixedly connected to the seat member and a second mounting device fixedly connected to the base member, wherein the deformable energy absorbing element is coupled to the first mounting device and to the second mounting device. By providing the child safety seat of the invention with such first and second mounting devices to which the deformable energy absorbing element is coupled, a load path can be defined for guiding loads from the seat member to the base member. The loads will be transferred from the seat member to the first mounting device, from the first mounting device to the deformable energy absorbing element, from the deformable energy absorbing element to the second mounting device, and from the second mounting device to the base member. The properties of the components in this load path can be systematically adjusted to achieve optimal restraint performance.

Advantageously, the child safety seat of the invention furthermore comprises two releasable connectors mounted to a lower region of the base member, the releasable connectors being configured to be attached to anchoring points provided in the vehicle to secure the child safety seat to the vehicle. Preferably, the releasable connectors are ISOFIX connectors. With the releasable connectors the child safety seat can be safely and reliably installed in the vehicle. In addition, the base member advantageously comprises a Top Tether which is configured to be fastened to an anchorage point provided in the vehicle behind the vehicle seat or a support leg which is configured to extend downwards from the front of the base member to the vehicle floor. Both Top Tether and support leg are provided as anti-rotation device. A seatbelt of the vehicle will not be required for fixing the child safety seat in the vehicle. With the two releasable connectors the base member of the child safety seat of the invention will be fixed to the vehicle. The seat member will not be directly coupled to the vehicle, only via the base member. Thus, the seat member will be free to slide forwards relative to the base member in the course of a frontal crash of the vehicle, thereby deforming the deformable energy absorbing element.

The deformable energy absorbing element of the child safety seat of the invention advantageously comprises at least two deformable components, wherein at least one deformable component is configured to selectively couple the first mounting device to the second mounting device to allow damping characteristics of the deformable energy absorbing element to be adapted to the child's weight by coupling a selected number of deformable components to the first mounting device and to the second mounting device. With such a child safety seat the restraint performance can be optimized by adjusting the damping characteristics of the deformable energy absorbing element to the weight of the child. For a very young and lightweight child a soft setting of the deformable energy absorbing element will be advantageous, whereas for a heavier child a stronger setting will be preferable. By increasing the number of deformable components coupling the first mounting device to the second mounting device the deformable energy absorbing element can be strengthened, by decreasing the number of deformable components coupling the first mounting device to the second mounting device the deformable energy absorbing element can be softened.

In a preferred embodiment of the invention the child safety seat comprises two deformable energy absorbing elements with each of these deformable energy absorbing elements comprising three deformable components. In each of the deformable energy absorbing elements a first deformable component is configured to permanently couple the first mounting device to the second mounting device, whereas the remaining two deformable components of each deformable energy absorbing element are configured to selectively couple the first mounting device to the second mounting device. The damping characteristics of the deformable energy absorbing element are then advantageously configured to be adjusted in three steps: (1) only the first deformable component of each deformable energy absorbing element couples the first mounting device to the second mounting device; (2) two deformable components of each deformable energy absorbing element couple the first mounting device to the second mounting device; (3) three deformable components of each deformable energy absorbing element couple the first mounting device to the second mounting device. Advantageously, a deformable component comprises a wavelike body, preferably made from steel, advantageously laser-cut as a single piece, but another type of deformable element might be used, such as a deployable steel plate.

Preferably, the child safety seat in accordance with the invention furthermore comprises a height adjustable headrest, a coupling component, and a selection device. The selection device is adapted to select the selected number of deformable components and the coupling component couples the headrest to the selection device in such a way that by adjusting the headrest's height the selection device is actuated to modify the selected number of deformable elements. This design makes use of the correlation between a child's size and the child's weight. By adjusting the headrest's height to the child's size the damping characteristics of the deformable energy absorbing element can be automatically adjusted to the child's weight.

In the child safety seat of the invention the selected number of deformable elements is preferably configured to increase as the headrest is being raised. Then, a stronger setting of the deformable energy absorbing element will be automatically chosen when the headrest's height is adjusted to suit the size of a larger child.

In the child safety seat of the invention the selected number of deformable elements is preferably configured to decrease as the headrest is being lowered. Then, a softer setting of the deformable energy absorbing element will be automatically chosen when the headrest's height is adjusted to suit the size of a smaller child.

In the child safety seat of the invention the coupling component advantageously comprises a bowden cable or a rigid strap and the selection device advantageously comprises a spring loaded pin. The bowden cable or the rigid strap of the coupling component will allow the spring loaded pin of the selection device to be coupled to the headrest in such a way that by raising or lowering the headrest the spring loaded pin will be displaced. Instead of a rigid strap other components with comparable characteristics may be used.

Preferably, the locking device of the child safety seat of the invention is configured to be unlocked upon activation of a seatbelt pretensioner of the vehicle. Activation of the seatbelt pretensioner is controlled by the electronic system of the vehicle. When the electronic system determines a critical crash situation, the seatbelt pretensioner will be activated. This will result in the locking device of the child safety seat being unlocked, allowing the seat member of the child safety seat to be displaced relative to the base member, thus deforming the deformable energy absorbing element. With this setup of the child safety seat of the invention the information processed by the electronic system of the vehicle can be utilized without requiring direct access to the electronic system.

Advantageously, the child seat of the invention furthermore comprises an actuator which is mechanically coupled to the locking device to allow the locking device to be unlocked by activation of the actuator, wherein the actuator is configured to be coupled to a seatbelt of the vehicle and configured to be activated upon activation of the seatbelt pretensioner associated with the seatbelt. The actuator of this child safety seat will serve as an indirect link to the electronic system of the vehicle.

Advantageously, the actuator comprises a hooked clamp which is pivotally attached to the seat member or to the base member. The hooked clamp is preferably adapted to receive a seatbelt so that when the seatbelt is being pulled, the hooked clamp pivots about a pivot axis. This pivoting of the hooked clamp is advantageously employed to unlock the locking device. To this end, the hooked clamp is preferably coupled to the locking device by a coupling component.

Specific embodiments of the invention will now be described by way of example and with reference to the accompanying drawings, in which:

FIG. 1a is a side view of a first embodiment of a child safety seat in accordance with the invention, wherein the seat member is in the initial position;

FIG. 1b is a side view of the child safety seat of FIG. 1a, wherein the seat member is in the shifted position;

FIG. 2 is a detail view of a lower portion of a child safety seat in accordance with the invention with a part of the seat member cut away to show the interior of the child safety seat;

FIG. 9 shows further details of the embodiment of FIG. 8.

Figure 3:
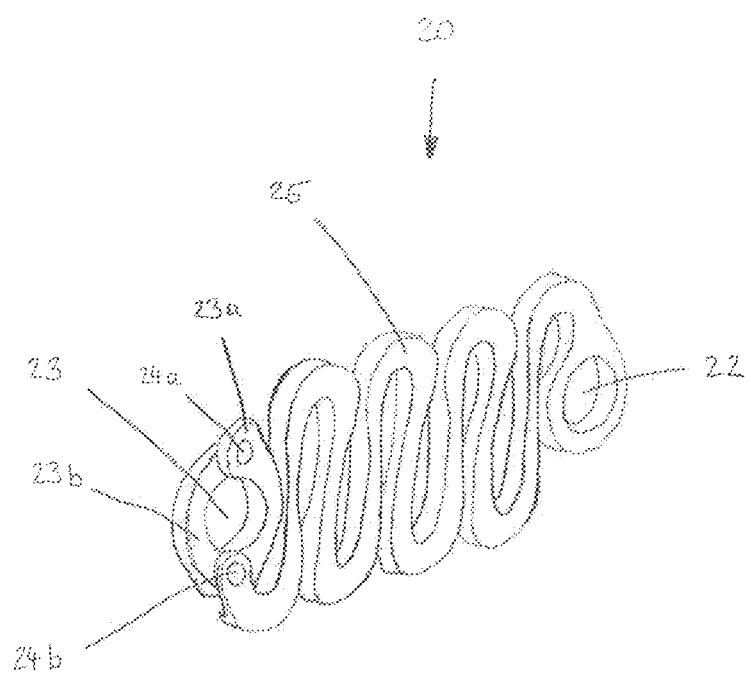
FIG. 3 shows a deformable energy absorbing element of a child safety seat in accordance with the invention.

FIG. 1a shows a child safety seat 1 for use in a vehicle in accordance with a first embodiment of the invention. The child safety seat 1 comprises a seat member 3 which is configured to hold a child 2 and a base member 4 which is adapted to be attached to a seat 15 of the vehicle. The seat 15 of the vehicle is schematically depicted in FIG. 1a and comprises two ISOFIX anchors 14, only one of them being shown in FIG. 1a. The base member 4 comprises two ISOFIX latches 10 configured to be coupled to the ISOFIX anchors 14. FIG. 1a shows one ISOFIX latch 10 which is coupled to an ISOFIX anchor 14. The base member 4 furthermore comprises a Top Tether 11 which is configured to be guided over the seatback of the vehicle seat 15 and to be fixed to an anchorage point provided in the vehicle. The seat member 3 is slidably mounted to the base member 4. The base member 4 comprises a lower part 4a and an upper part 4b. The upper part 4b of the base member 4 comprises an upper guide slot 6 which is preferably curved. The lower part 4a of the base member 4 comprises a lower guide slot 8 which extends in longitudinal direction. The seat member 3 comprises a guide pin 7 which engages with the upper guide slot 6. The seat member 3 furthermore comprises a sliding member 9 which engages with the lower guide slot 8. FIG. 1a shows the child safety seat 1 in the upright position. In this position the guide pin 7 is located at or near the upper end of the upper guide slot 6 and the sliding member 9 is located at or near the rearward end of the lower guide slot 8.

FIG. 1b shows the child safety seat 1 of FIG. 1a with the seat member 3 displaced from the upright position shown in FIG. 1a to a shifted position. The seat member 3 has been displaced relative to the base member in the direction indicated by arrows 12. During this displacement the guide pin 7 has traveled along the upper guide slot 6 so that it is now located at or near the lower end of the upper guide slot 6. Furthermore, the sliding member 9 has been shifted forward so that the guiding member 9 is now located at or near the front end of the lower guide slot 8.

This displacement of the seat member 3 from the upright position shown in FIG. 1a to the shifted position shown in FIG. 1b may be induced by inertial forces acting on seat member 3 during a frontal impact of the vehicle carrying the child safety seat 1. If the vehicle carrying the child safety seat 1 is involved in an accident with a frontal impact, the vehicle will be suddenly decelerated. This sudden deceleration is transferred via the vehicle seat 15, the ISOFIX anchors 14 and the ISOFIX latches 10 to the base member 4 and to the seat member 3, i.e. to the child safety seat 1. Finally, the deceleration resulting from the frontal impact is transferred from the seat member 3 to the child 2 via fixing means provided for retaining the child 2 in the child safety seat 1, i.e. for instance by a harness (not shown in FIG. 1a). The forces acting on the child 2 and the child safety seat 1 are proportional to the decelerations experienced by the child 2 and the child safety seat 1. Since these inertial forces act on the seat member 3 in the forward direction, they tend to displace the seat member 3 from the upright position of FIG. 1a to the shifted position of FIG. 1b.

FIG. 2 shows the lower portion of a child safety seat 1 in accordance with the invention in detail with a part of the seat member 3 cut away to show the interior of the child safety seat 1. The child safety seat 1 shown in FIG. 2 comprises a first mounting device 21a which is fixedly connected to the seat member 3 and a second mounting device 21b which is fixedly connected to the base member 4. The first mounting device 21a is a crossbar fastened to the seat member 3 and the second mounting device 21b is a crossbar fastened to the base member 4. Advantageously, the crossbars have a circular cross section. The child safety seat shown in FIG. 2 furthermore comprises a deformable energy absorbing element 20. The deformable energy absorbing element 20 comprises three deformable components. In other embodiments, not shown in FIG. 2, the deformable energy absorbing element 20 might comprise less or more than three deformable components, such as two of four deformable components. Each deformable component consists of a band with a loop provided at each end of the band. The loops are configured to receive the crossbars 21a and 21b. Therefore, the deformable components couple the first mounting device 21a to the second mounting device 21b. Each band is folded into several curves. Therefore, the deformable components have a wavelike shape. When the seat member 3 is in its normal (pre-crash) position, the first mounting device 21a and the second mounting device 21b are positioned at a specific distance to each other. The energy absorbing element 20 is configured to couple the first mounting device 21a to the second mounting device 21b.

When the seat member 3 is displaced from its normal pre-crash position (FIG. 1a) to the shifted position (FIG. 1b), the lower part of the seat member 3 is shifted forward relative to the base member 4. Since the first mounting device 21a is fixedly connected to the seat member 3, shifting the seat member 3 forward will also shift forward the first mounting device 21a. Furthermore, since the second mounting device 21b is fixedly connected to the base member 4, the second mounting device 21b will not be displaced by shifting the seat member 3 relative to the base member 4. As a result, shifting the seat member 3 forward will alter the distance between the first mounting device 21a and the second mounting device 21b. With the arrangement of the mounting devices 21a and 21b shown in FIG. 2, i.e. with the first mounting device 21a positioned in front of the second mounting device 21b, shifting the seat member 3 forward will increase the distance between the first mounting device 21a and the second mounting device 21b. Since the deformable energy absorbing element 20 couples the first mounting device 21a to the second mounting device 21b, the deformable energy absorbing element 20 will be stretched during this process. A deformable energy absorbing element in the stretched state 20' is also shown in FIG. 2.

FIG. 3 shows a deformable energy absorbing element 20 of a child safety seat in accordance with the invention in detail. The deformable energy absorbing element 20 has a wavelike shape and comprises a first circular loop 22 at its first end and a second circular loop 23 at its second end. The circular loops 22 and 23 are adapted to receive mounting devices in the form of crossbars. Since the loops 22 and 23 are circular, the energy absorbing element 20 can generally rotate about the crossbars, irrespective of the cross section of the crossbars, so that the energy absorbing element 20 does not impose a torque on the crossbars when a pulling force is applied to the energy absorbing element 20. Advantageously, the crossbars will also have a circular cross section, adapted to the shape of the loops 22 and 23. The second loop 23 comprises a first component 23a and a second component 23b. These two components 23a and 23b are joined together by two pins 24a and 24b. The first pin 24a joins together the upper parts of the first and second component 23a and 23b, whereas the second pin 24b joins together the lower parts of the first and second component 23a and 23b. Furthermore, the lower pin 24b connects the second loop 23 to the wavelike body 25 of the energy absorbing element 20.

Advantageously, the lower pin 24b pivotally couples the second loop 23 to the body 25 of the energy absorbing element 20.

Figure 4A:
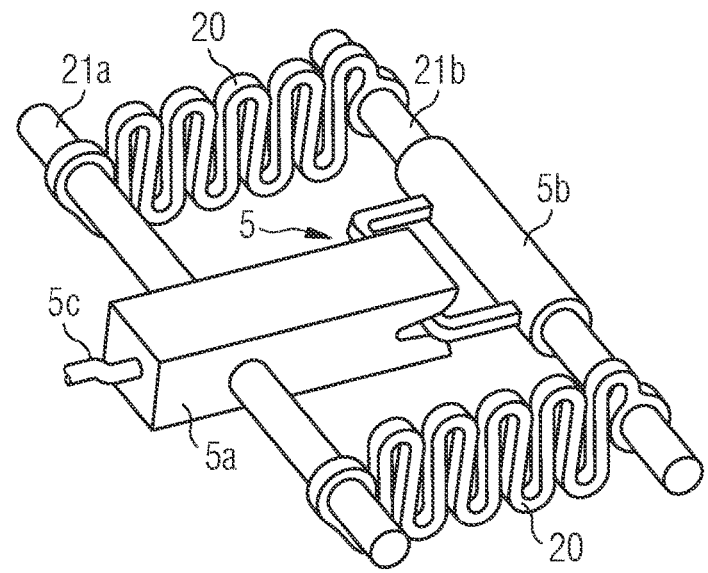
FIG. 4a shows two deformable energy absorbing elements connected to two mounting devices with the energy absorbing elements in a relaxed state and a locked locking device.

FIG. 4a shows an assembly of two deformable energy absorbing elements 20, two mounting devices 21a and 21b, and a locking device 5. Each of the two deformable energy absorbing elements 20 is coupled at one of its ends to a first mounting device 21a and at its other end to a second mounting device 21b. The deformable energy absorbing elements 20 are in their normal pre-crash state. The locking device 5 couples the first mounting device 21a to the second mounting device 21b. In the locked state shown in FIG. 4a the first and second mounting devices 21a and 21b cannot be pulled apart, since they are locked by the locking device 5. The locking device 5 comprises a first component 5a and a second component 5b. Advantageously, the first component 5a comprises an ISOFIX connector which is mounted to the first mounting device 21a. Advantageously, the second component 5b comprises a clamp which is rotatably mounted to the second mounting device 21b and which is configured to engage with the first component 5a. The first component 5a furthermore comprises a control connector 5c. This control connector 5c allows the locking device 5 to get unlocked. Preferably, the control connector 5c comprises a bowden cable.

Figure 4B:
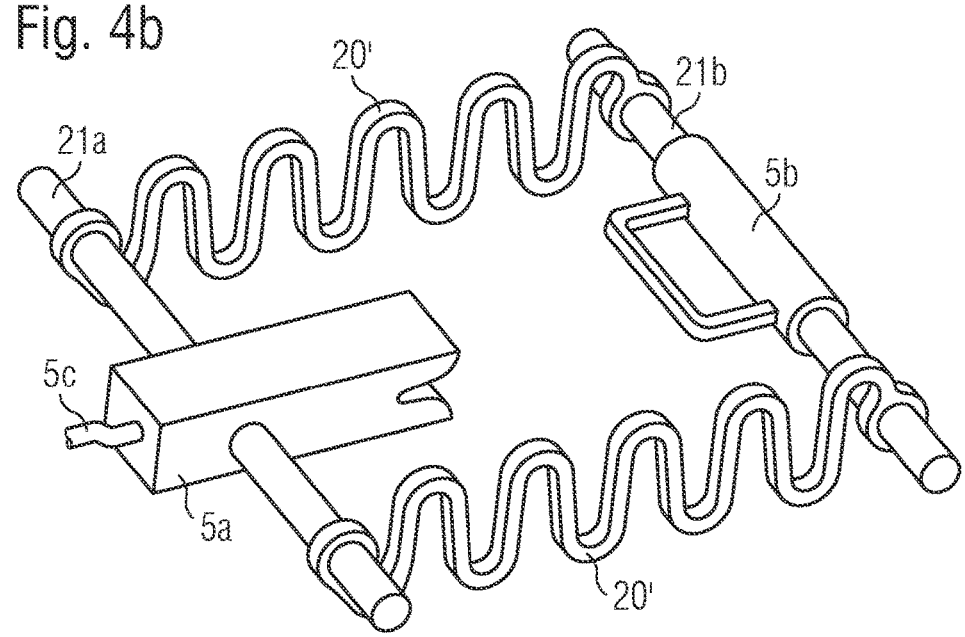
FIG. 4b shows two deformable energy absorbing elements connected to two mounting devices with the energy absorbing elements in a stretched state and an unlocked locking device.

Once the locking device 5 is unlocked, the first and second mounting devices 21a and 21b can be pulled apart, thereby stretching the deformable energy absorbing element 20. FIG. 4b shows the assembly of FIG. 4a with the energy absorbing elements 20' in a stretched state. The energy absorbing elements 20' will adopt this state when the first mounting device 21a which is coupled to the seat member 3 is displaced forward during a frontal crash of the vehicle.

Figure 5A:
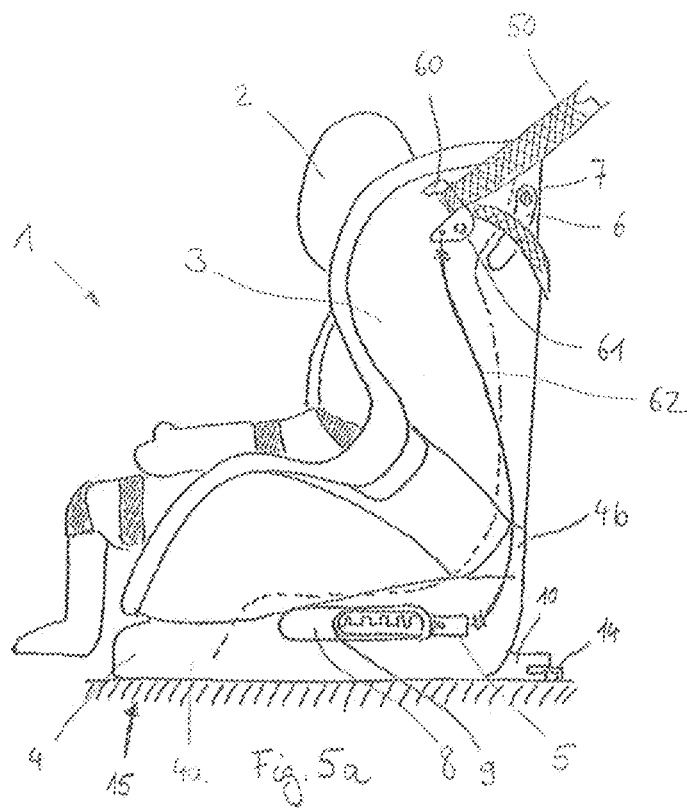
FIG. 5a is a side view of another embodiment of a child safety seat in accordance with the invention with a seatbelt connected to the child safety seat, wherein the seat member is in the initial position.
Figure 5B:
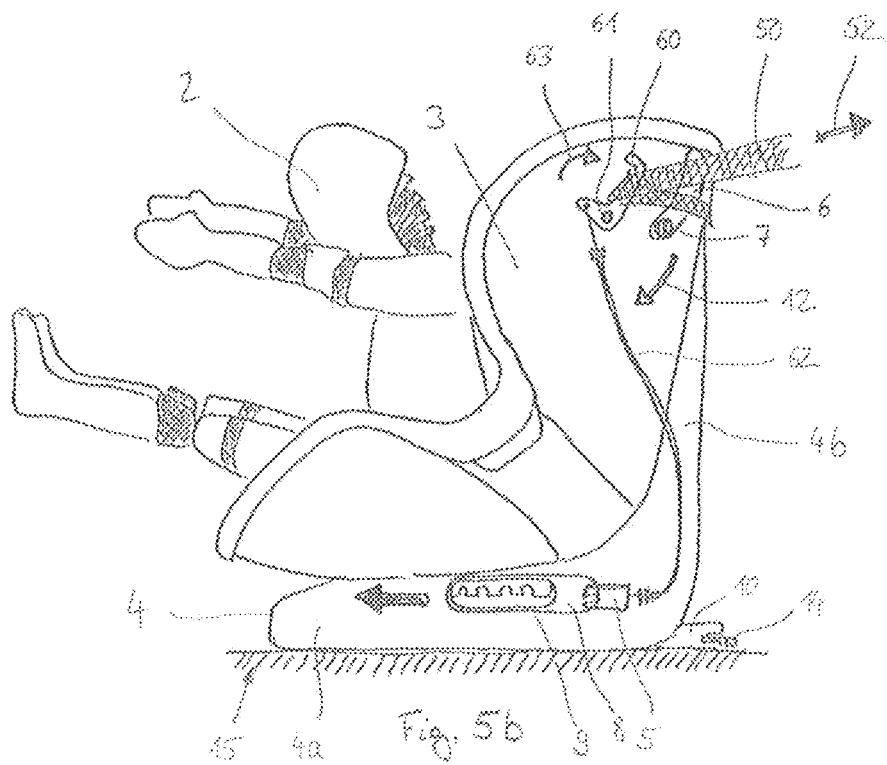
FIG. 5b is a side view of the child safety seat of FIG. 5a, wherein the seat member is in the shifted position.

FIGS. 5a and 5b illustrate a further aspect of the invention. These Figures are very similar to FIGS. 1a and 1b. The child safety seat 1 shown in FIGS. 5a and 5b, however, comprises an actuator 60 which is configured to receive a seatbelt 50 provided in the vehicle the child safety seat 1 is installed in. The actuator 60 couples the seatbelt 50 to the child safety seat in such a way that by pulling the seatbelt 50 the locking device 5 locking the seat member 3 in the upright position can be unlocked. The actuator 60 is a hooked clamp which is pivotally attached to the seat member 3 and is configured to pivot about pivot axis 61. The actuator 60 is coupled to the locking device 5 by a coupling component, such as bowden cable 62. FIG. 5a shows the child safety seat 1 with the seat member 3 locked in the upright position. The actuator 60 is coupled to the seatbelt 50 and is configured to be activated upon activation of the seatbelt pretensioner associated with the seatbelt 50. When the seatbelt 50 is pulled by the seatbelt pretensioner in the direction indicated by arrow 52 in FIG. 5b, the actuator 60 will be activated and will unlock the locking device 5. More specifically, the actuator 60 will pivot about pivot axis 60 in the clockwise direction indicated by arrow 63, thus pulling the bowden cable 62, thereby unlocking the locking device 5. The seat member 3 can then slide forwards into the position shown in FIG. 5b.

Figure 6:
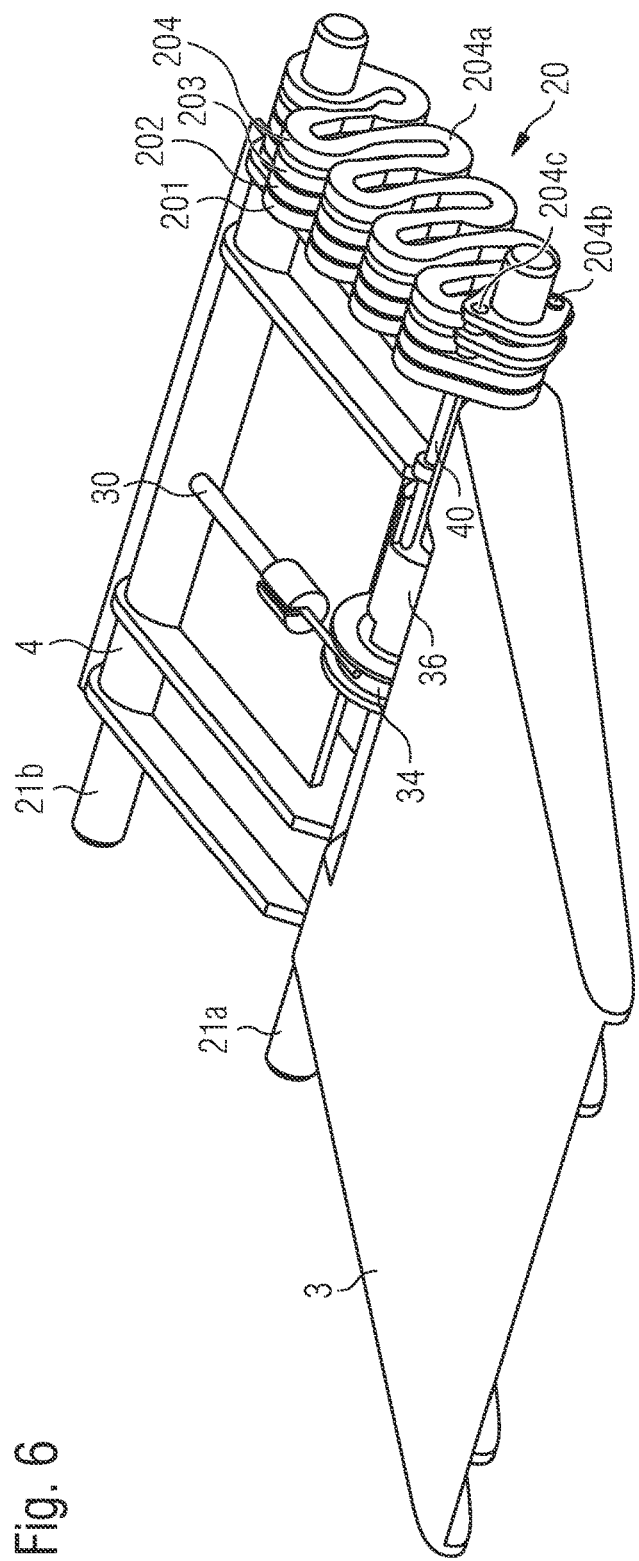
FIG. 6 shows details of the interior of a child safety seat in accordance with the invention with an energy absorbing element comprising four deformable components which are configured to selectively couple the first mounting device to the second mounting device.
Figure 7:
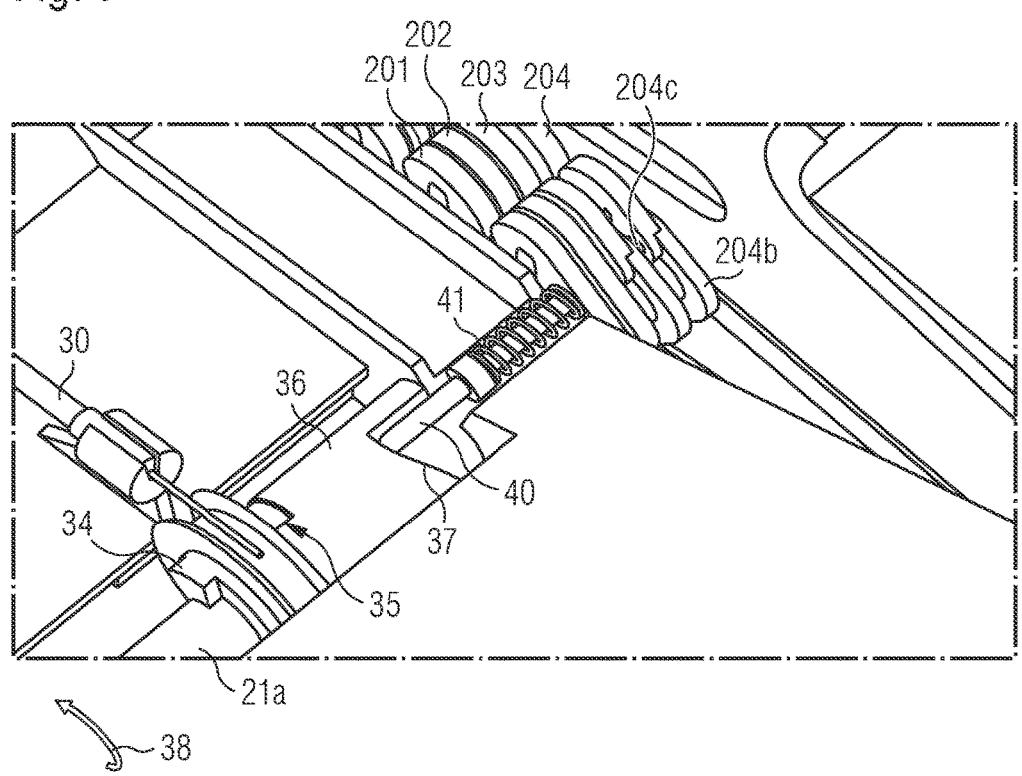
FIG. 7 shows further details of the mechanism allowing selective coupling of deformable components.

FIG. 6 and FIG. 7 illustrate a further aspect of the present invention. These Figures illustrate how, in a preferred embodiment of the invention, the damping characteristics of the deformable energy absorbing element can be adapted to specific needs. FIG. 6 shows a section of the seat member 3 and the base member 4 of a child safety seat in accordance with the invention. A first mounting device 21a in the form of a crossbar is connected to the seat member 3 and a second mounting device 21b in the form of a crossbar is connected to the base member 4. A deformable energy absorbing element 20 is coupled to the first and second mounting devices 21a and 21b. The deformable energy absorbing element 20 comprises four deformable components 201-204. The first two deformable components 201-202 are configured to permanently couple the first mounting device 21a to the second mounting device 21b. In contrast, the other two deformable components 203-204 are configured to selectively couple the first mounting device 21a to the second mounting device 21b. The child safety seat furthermore comprises a coupling component 30, a pulley 34, a rotational crank 36, and a selection device 40. The coupling component 30 is implemented as a bowden cable and the selection device 40 is implemented as a spring loaded pin. The bowden cable 30 connects the height adjustable headrest of the child safety seat with the pulley 34 in such a way that lowering or raising of the headrest will rotate the pulley 34. Rotation of the pulley 34 can drive the rotational crank 36 which is installed on the first mounting device 21a. Rotation of the rotational crank 36 will in turn actuate the selection device 40. Depending on the direction of rotation of the rotational crank 36, the spring loaded pin will be pushed towards the deformable components 203-204 or will be allowed to retract from the deformable components 203-204. The actuation of the selection device 40 will be described in more detail in connection with FIG. 7.

Deformable component 204 comprises two parts: a wavelike body 204a and a loop 204b. The wavelike body 204a is mounted to the second mounting device 21b and the loop 204b is mounted to the first mounting device 21a. Near its front end the wavelike body 204a comprises a hole which, in the configuration shown in FIG. 6 is flush with a hole 204c provided in the loop 204b. Deformable component 203 has the same structure as deformable component 204. The spring loaded pin 40 is configured to be pushed through the holes provided in the loops and bodies of deformable elements 203 and 204. When the pin 40 is pushed through hole 204c, for example, the pin 40 couples the wavelike body 204a of the deformable component 204 to the loop 204b. Thus, by pushing the pin 40 through hole 204c, the loop 204b gets connected to the wavelike body 204a. As a result, the deformable component 204 will couple the first mounting device 21a to the second mounting device 21b. In contrast, when the pin 40 is not pushed through hole 204c, the deformable component 204 does not couple the first mounting device 21a to the second mounting device 21b. In this configuration, the loop 204b is not connected to the wavelike body 204a.

Therefore, the setup shown in FIG. 6 allows the damping characteristics of the deformable energy absorbing element to be adjusted in three steps or stages: (1: softest setting) When the pin 40 is fully retracted, the first mounting device 21a is coupled to the second mounting device 21b only by the two deformable components 201 and 202. (2: intermediate setting) The pin 40 is pushed outwards until it locks the deformable component 203. Then the first mounting device 21a is coupled to the second mounting device 21b by the three deformable components 201, 202, and 203. (3: strongest setting) When the pin 40 is pushed fully outwards, it locks the deformable components 203 and 204. The first mounting device 21a is then coupled to the second mounting device 21b by all four deformable components 201, 202, 203, and 204. Conveniently, the bowden cable 30 is coupled to the height adjustable headrest and to the pulley 34 in such a way that when the headrest is in the highest position the pin 40 is pushed fully outwards, thus selecting the strongest setting. Furthermore, the bowden cable 30 is coupled to the height adjustable headrest and to the pulley 34 in such a way that when the headrest is in the lowest position the pin 40 is fully retracted (towards the pulley 34), thus selecting the softest setting. When the headrest is in an intermediate position, the intermediate setting will be selected.

As a result, by placing the headrest at a specific position for a child of a given size, the damping characteristics of the deformable energy absorbing element 20 will be automatically adjusted to fit this child. For a small and lightweight child the headrest will be placed in the lowest position, thus selecting the softest setting for the deformable energy absorbing element 20. This will be the best setting for a lightweight child. For a tall and therefore heavier child the headrest will be placed in the highest position, thus selecting the strongest setting for the deformable energy absorbing element 20. This will be the best setting for a heavier child. Analogous considerations apply to the intermediate setting of the deformable energy absorbing element 20.

Although FIG. 6 shows only one energy absorbing element 20 installed on one side of the child safety seat, it might be advantageous to provide the child safety seat with two energy absorbing elements, with one installed on either side of the seat. Furthermore, it might be advantageous to partition the deformable energy absorbing element into more than four deformable components. By employing more than four deformable components, the damping characteristics will be adjustable with a finer granularity.

FIG. 7 shows some features of the arrangement of FIG. 6 in more detail. The rotational crank 36 exhibits a cam surface 37 which is in contact with the pin 40. A spring 41 is provided to push the pin 40 towards the cam surface 37 of the rotational crank 36. In the configuration shown in FIG. 7 the pin 40 is fully retracted. In this configuration, the pin 40 is not in contact with the third deformable component 203 or the fourth deformable component 204. The pin 40 is, however, in contact with the first deformable component 201 and with the second deformable component 202. Preferably, each of the deformable components 201 and 202 comprises a hole in which the pin 40 is inserted in the configuration shown in FIG. 7. These holes are advantageously configured to direct or guide the pin 40 in the desired direction, i.e. towards the third deformable component 203. When the rotational crank 36 is turned in the direction indicated by arrow 38 the pin 40 will be pushed outwards, towards deformable components 203 and 204, by the cam surface 37. When the pin 40 is pushed fully outwards, it will be inserted in hole 204c, thus connecting loop 204b to the wavelike body 204a of the deformable component 204. The deformable component 204 will then be locked. When the rotational crank 36 is turned back, i.e. in the opposite direction of arrow 38, the pin 40 will be pushed back towards the pulley 34 by the spring 41, thus unlocking the deformable component 204.

FIG. 7 furthermore shows that a clutch 35 is provided between pulley 34 and rotational crank 36. This clutch 35 may be implemented by a projection formed on pulley 34 and a recess formed on the rotational crank 36 with the projection being arranged in the recess. Advantageously, projection and recess are dimensioned so that, when the headrest is in the lowest position, raising the headrest will not immediately cause the rotational crank 36 to rotate. This can be achieved by making the recess longer than the projection. Then, when the pulley 34 starts to rotate, the projection will begin to move along the recess. As long as the projection moves along the recess, the pulley 34 does not drive the rotational crank 36. As soon as the projection reaches the end of the recess, however, the projection will contact the rotational crank 36 and will begin to drive the rotational crank 36.

In a preferred embodiment of the invention the headrest's height can be adjusted by 120 mm. This equals a rotation of the pulley 34 by 540 degrees. In the first 180 degrees of this rotation the clutch 35 is disengaged. Between 180 degrees and 540 degrees the clutch 35 is engaged and the rotational crank 36 will therefore be turning together with the pulley 34. As a result, the rotational crank 36 will push the pin 40 either by 0 mm or 5 mm or 10 mm outward, thus locking neither deformable component 203 nor deformable component 204 (0 mm), or locking only deformable component 203 (5 mm), or locking both deformable component 203 and deformable component 204 (10 mm).

Figure 8:
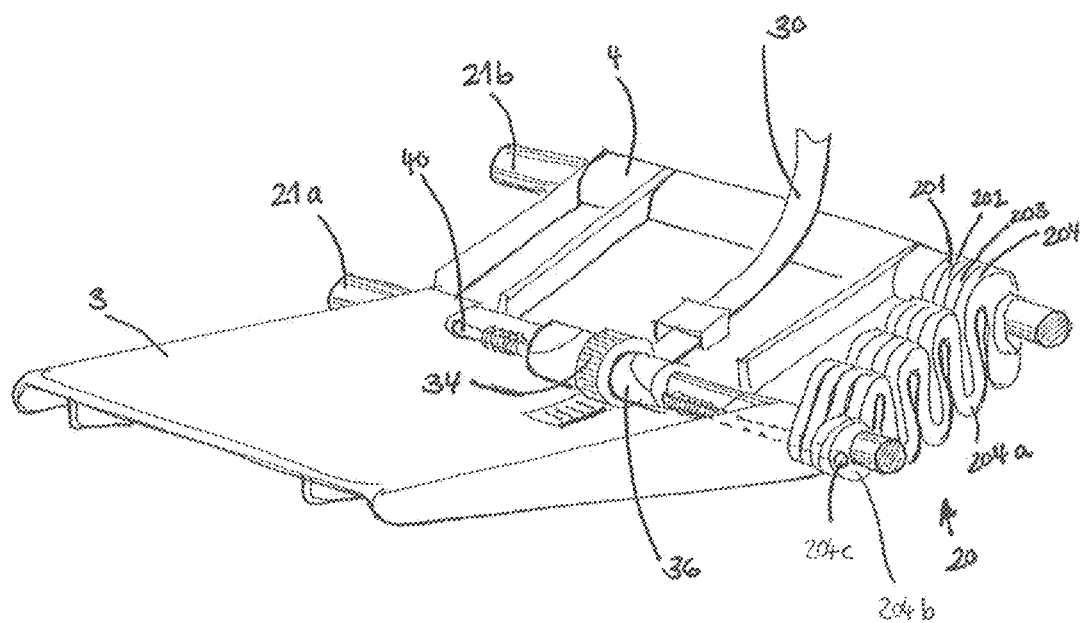
FIG. 8 shows details of the interior of a child safety seat in accordance with another embodiment of the invention.

FIG. 8 and FIG. 9 show another preferred embodiment of the invention which is similar to the embodiment of FIGS. 6 and 7. The general technical principle of the embodiment of FIGS. 8 and 9 is essentially identical to the technical principle of the embodiment of FIGS. 6 and 7. Therefore, only the differences between the two embodiments will be described in detail. FIG. 8 shows that in this embodiment a rigid strap is used as coupling component 30. Naturally, the rigid strap 30 is not completely rigid. Instead, the rigid strap 30 exhibits a certain degree of flexibility which allows it to be bent, as shown in FIG. 8. The rigid strap 30 is, however, sufficiently rigid to allow the rigid strap 30 to transfer not only pulling forces, but also pushing forces. Furthermore, the pulley of FIGS. 6 and 7 is replaced by a gearwheel 34 which is mounted to the rotational crank 36. The rigid strap 30 comprises teeth which are configured to mesh with the teeth of the gearwheel 34. Thus, when the rigid strap 30 is pushed or pulled along the gearwheel 34, the gearwheel 34 is set in motion. The rigid strap 30 is advantageously made from plastic. The rigid strap 30 made from plastic is a lightweight, cheap, and easy to handle component, in particular in comparison to the bowden cable of FIGS. 6 and 7.

FIG. 9 illustrates further aspects of the present invention. The left part of FIG. 9 shows how the headrest 300 of the child safety seat is coupled by the rigid strap 30 to the rotational crank 36. When the headrest 300 is being raised (arrow 301), the rigid strap 30 is being pulled in the direction away from the rotational crank 36, thus rotating the rotational crank 36 in a first direction of rotation. When the headrest 300 is being lowered (arrow 302), the rigid strap 30 is being pushed in the direction towards the rotational crank 36, thus rotating the rotational crank 36 in a second direction of rotation, opposite to the first direction of rotation.

The upper right part of FIG. 9 shows a front view of a section of the first mounting device 21a which carries the rotational crank 36 which, in turn, carries the gearwheel 34. The rotational crank 36 has a stepped end section 36a. The pin 40 is pushed towards this stepped end section 36a by the spring 41. The stepped end section 36a is configured to shift the pin 40 in steps: when the pin 40 is in contact with the highest step of the stepped end section 36a, the pin 40 is in its rightmost position, similar to the position shown in FIG. 9. When the rotational crank 36 is rotated in the appropriate direction, the pin 40, being pushed by the spring 41, will slide from the highest step to the intermediate step of the rotational crank 36. The pin 40 will then be in an intermediate position. When the rotational crank 36 is rotated even further, the pin 40 will slide from the intermediate step to the lowest step of the rotational crank 36. The pin 40 will then be in its leftmost position. Thus, the pin 40 can be brought into contact with a selected number of deformable elements 201-203.

The lower right part of FIG. 9 shows a cross section of the gearwheel 34 mounted to the rotational crank 36.

LIST OF REFERENCE NUMERALS 1 child safety seat
2 child
3 seat member
4 base member
4a lower part of base member 4
4b upper part of base member 4
5 locking device
5a first component of locking device 5
5b second component of locking device 5
5c control connector
6 upper guide slot
7 guide pin
8 lower guide slot
9 sliding member
10 ISOFIX latch
11 Top Tether
12 direction of displacement
14 ISOFIX anchor
15 vehicle seat
20 deformable energy absorbing element
20' deformable energy absorbing element in stretched state
21a first mounting device
21b second mounting device
22 first loop
23 second loop
23a first component of second loop 23
23b second component of second loop 23
24a first pin
24b second pin
25 body of deformable energy absorbing element
30 coupling component
34 pulley
35 clutch
36 rotational crank
36a stepped end section of rotational crank 36
37 cam surface
38 direction of rotation
40 selection device
41 spring
50 seatbelt
51 seatbelt receiver
52 pulling direction
60 actuator
61 pivot axis
62 bowden cable
63 release direction
201-204 deformable components of energy absorbing element 20
204a body of deformable component 204
204b loop of deformable component 204
204c hole provided in loop 204b
300 headrest
301 upward direction
302 downward direction

The invention claimed is:

1. A child safety seat for use in a vehicle, the child safety seat comprising:
a seat member configured to hold a child,
a base member adapted to be attached to a seat of the vehicle,
a deformable energy absorbing element,
a first mounting device fixedly connected to the seat member, and
a second mounting device fixedly connected to the base member,
wherein the deformable energy absorbing element is coupled to the first mounting device and to the second mounting device,
wherein the deformable energy absorbing element comprises at least two deformable components, wherein at least one deformable component is configured to selectively couple the first mounting device to the second mounting device to allow damping characteristics of the deformable energy absorbing element to be adapted to a weight of the child by coupling a selected number of deformable components to the first mounting device and to the second mounting device,
wherein the seat member is slidably mounted to the base member, the seat member being displaceable from an initial position to a shifted position by sliding the seat member relative to the base member and in response to crash-induced inertial forces acting on the child safety seat during a frontal collision of the vehicle, and
wherein the deformable energy absorbing element is arranged to be deformed when the seat member is slid from the initial position to the shifted position.

2. The child safety seat of claim 1, furthermore comprising a locking device which is configured to lock the seat member in the initial position, preventing sliding of the seat member from the initial position to the shifted position, and wherein the locking device is adapted to release the seat member from the initial position if the crash-induced forces reach or exceed a given threshold value, allowing the seat member to slide from the initial position to the shifted position.

3. The child safety seat of claim 2, wherein the locking device is configured to be unlocked upon activation of a seatbelt pretensioner of the vehicle.

4. The child safety seat of claim 2, furthermore comprising an actuator which is mechanically coupled to the locking device to allow the locking device to be unlocked by activation of the actuator, wherein the actuator is configured to be coupled to a seatbelt of the vehicle and configured to be activated upon activation of a seatbelt pretensioner associated with the seatbelt.

5. The child safety seat of claim 4, wherein the actuator comprises a hooked clamp which is pivotally attached to the seat member or to the base member.

6. The child safety seat of claim 1, wherein the child safety seat is configured for forward-facing installation in the vehicle.

7. The child safety seat of claim 1, wherein the deformable energy absorbing element is configured to be stretched or compressed during crash-induced displacement of the seat member relative to the base member.

8. The child safety seat of claim 1, furthermore comprising two releasable connectors mounted to a lower region of the base member, the releasable connectors being configured to be attached to anchoring points provided in the vehicle to secure the child safety seat to the vehicle.

9. The child safety seat of claim 8, furthermore comprising a top tether attached to the base member and configured to be fastened to an anchorage point provided in the vehicle or a support leg attached to the base member and configured to extend downwards from the front of the base member.

10. The child safety seat of claim 1, furthermore comprising a height adjustable headrest a coupling component, and a selection device adapted to select the selected number of deformable components, wherein the coupling component couples the headrest to the selection device in such a way that by adjusting a height of the headrest, the selection device is actuated to modify the selected number of deformable elements.

11. The child safety seat of claim 10, wherein the selected number of deformable elements is configured to increase as the headrest is being raised.

12. The child safety seat of claim 10, wherein the selected number of deformable elements is configured to decrease as the headrest is being lowered.

13. The child safety seat of claim 10, wherein the coupling component comprises a bowden cable or a rigid strap and the selection device comprises a spring loaded pin.

* * * * *